United States Patent
Sayles

(10) Patent No.: US 9,385,561 B2
(45) Date of Patent: Jul. 5, 2016

(54) CHARGING COIL SYSTEM FOR A DROP-IN TARGET DEVICE SUCH AS A TOOTHBRUSH

(71) Applicant: Koninklijke Philips N.V., Eindhoven (NL)

(72) Inventor: Thomas Jackson Sayles, Fall City, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 144 days.

(21) Appl. No.: 14/366,282

(22) PCT Filed: Dec. 10, 2012

(86) PCT No.: PCT/IB2012/057117
§ 371 (c)(1),
(2) Date: Jun. 18, 2014

(87) PCT Pub. No.: WO2013/093697
PCT Pub. Date: Jun. 27, 2013

(65) Prior Publication Data
US 2014/0333260 A1    Nov. 13, 2014

Related U.S. Application Data

(60) Provisional application No. 61/578,970, filed on Dec. 22, 2011.

(51) Int. Cl.
*H02J 7/00* (2006.01)
*H02J 5/00* (2006.01)
*H01F 21/00* (2006.01)
*H02J 7/02* (2016.01)
(Continued)

(52) U.S. Cl.
CPC ............ *H02J 7/025* (2013.01); *H02J 5/005* (2013.01); *H01F 21/02* (2013.01); *H01F 21/04* (2013.01); *H01F 21/06* (2013.01); *H01F 21/08* (2013.01); *H01F 38/14* (2013.01)

(58) Field of Classification Search
CPC ............ H02J 7/00; H02J 7/025; H02J 5/005; H01F 38/14; H01F 21/02; H01F 21/04; H01F 21/06; H01F 21/08
USPC ............... 320/108; 336/40, 75, 118, 133, 160
See application file for complete search history.

(56) References Cited

U.S. PATENT DOCUMENTS 4,176,335 A * 11/1979 Charpentier ........ H01F 27/2866
336/180
6,043,644 A *  3/2000 de Coulon .............. G01P 3/488
324/164

(Continued)

FOREIGN PATENT DOCUMENTS

DE      10218124 A1    11/2003
DE    102007053985 A1     5/2009

(Continued)

*Primary Examiner* — Phallaka Kik

(57) ABSTRACT

A system for efficiently charging a target device such as a power toothbrush, when placed in a charging receptacle such as a cup connected to a source of electrical power. A plurality of steering coils are arranged around the primary charging coil in the charging receptacle. A control circuit changes the magnetic field phase pattern of the steering coils relative to the phase of magnetic field of the primary coil until the maximum power transfer between the charging receptacle and the target device is determined. Charging of the target device occurs at the maximum power transfer rate.

14 Claims, 4 Drawing Sheets

(51) Int. Cl.
*H01F 21/02* (2006.01)
*H01F 21/08* (2006.01)
*H01F 21/04* (2006.01)
*H01F 21/06* (2006.01)
*H01F 38/14* (2006.01)

(56) References Cited

U.S. PATENT DOCUMENTS

| | | | | |
|---|---|---|---|---|
| 6,803,744 B1 * | 10/2004 | Sabo | ............... | H02J 7/025 307/104 |
| 7,317,374 B2 * | 1/2008 | Flanders | ............... | H01F 3/14 336/182 |
| 8,570,187 B2 * | 10/2013 | Janna | ............... | H01Q 1/2216 336/192 |
| 8,853,891 B2 * | 10/2014 | Soar | ............... | F41H 1/02 307/104 |
| 2007/0145830 A1 * | 6/2007 | Lee | ............... | H02J 5/005 307/135 |
| 2007/0279002 A1 | 12/2007 | Partovi | | |
| 2009/0102419 A1 * | 4/2009 | Gwon | ............... | H02J 7/025 320/108 |
| 2009/0189459 A1 * | 7/2009 | Seefried | ............... | H01F 38/14 307/104 |
| 2011/0062793 A1 * | 3/2011 | Azancot | ............... | H01F 38/14 307/116 |
| 2011/0074349 A1 * | 3/2011 | Ghovanloo | ............... | H02J 5/005 320/108 |
| 2011/0106210 A1 * | 5/2011 | Meskens | ............... | H01Q 1/125 607/57 |
| 2011/0115430 A1 * | 5/2011 | Saunamaki | ............... | H02J 5/005 320/108 |
| 2011/0204845 A1 * | 8/2011 | Paparo | ............... | H01F 38/14 320/108 |
| 2011/0205083 A1 * | 8/2011 | Janna | ............... | H01Q 7/02 340/870.31 |
| 2012/0049640 A1 * | 3/2012 | Ichikawa | ............... | H02J 5/005 307/99 |
| 2012/0146426 A1 * | 6/2012 | Sabo | ............... | H02J 7/025 307/104 |
| 2012/0153740 A1 * | 6/2012 | Soar | ............... | F41H 1/02 307/104 |
| 2012/0217111 A1 * | 8/2012 | Boys | ............... | H01F 38/14 191/10 |
| 2012/0235636 A1 * | 9/2012 | Partovi | ............... | H02J 7/025 320/108 |
| 2013/0005251 A1 * | 1/2013 | Soar | ............... | B60N 2/4876 455/41.1 |
| 2013/0024059 A1 * | 1/2013 | Miller | ............... | H01F 38/14 701/22 |
| 2013/0088192 A1 * | 4/2013 | Eaton | ............... | G06F 1/266 320/108 |
| 2013/0088204 A1 * | 4/2013 | Khare | ............... | H02J 7/0047 320/134 |
| 2013/0091225 A1 * | 4/2013 | Eaton | ............... | H02J 7/025 709/206 |

FOREIGN PATENT DOCUMENTS

EP        2161811 A1        3/2010
WO        2011138507 A2        11/2011

* cited by examiner

CHARGING COIL SYSTEM FOR A DROP-IN TARGET DEVICE SUCH AS A TOOTHBRUSH

CROSS-REFERENCE TO PRIOR APPLICATIONS

This application is the U.S. National Phase application under 35 U.S.C. §371 of International Application No. PCT/IB2012/057117, filed on Dec. 10, 2012, which claims the benefit of U.S. Provisional Patent Application No. 61/578,970, filed on Dec. 22, 2011. These applications are hereby incorporated by reference herein.

This invention relates generally to charging systems for target devices such as power toothbrushes, and more specifically concerns a particular charging system for the combination of a target device and a cup receptacle charger into which the target device is positioned for charging.

Many target devices, such as power toothbrushes, but other devices as well, include an inductive charging system operating with a charging base assembly with a primary coil and a target device with a secondary coil. Such systems typically require close alignment, i.e. lined up in registry, of the primary and secondary coils in the charging base and the target device, respectively, to achieve efficient charging and to protect the charging interface from interference. A "drop-in" type charger system, which allows users to simply drop the target device into a receptacle, such as a glass, which may be used for drinking, is inefficient because of a lack of close alignment. Typically, such an arrangement, in which the target device may not be closely aligned with the primary coil, extends the charging time at least 50%, if not more. The difficulty in alignment occurs because the secondary coil will typically be angled relative to the primary coil when it is positioned in a cup receptacle charger instead of a conventional charger base in which the target device fits relatively tightly. This can be seen in FIG. 1.

Accordingly, it is desirable to have a charging system which is arranged and controlled to provide maximum efficiency for those charging systems which use a cup receptacle as a charger base.

Accordingly, the system for charging one or more target devices with a receptacle charger, comprises: a receptacle charger for receiving one or more target devices, the receptacle having a primary coil therein connectable to a source of electrical power; at least one target device positionable in the receptacle, the target device having a secondary coil such that in operation energy is transferred between the primary coil and secondary coil to charge a battery in the target device; a plurality of steering coils arranged around the primary coil; and a control system for controlling the magnetic field phase of the steering coils relative to the magnetic field of the primary coil so as to focus the magnetic field lines of the primary coil to optimize power transfer between the primary coil in the receptacle charger and the secondary coil of the target device.

Further, the method for controlling the charging of at least one target device positioned in a receptacle, the target device having a primary coil and the charging receptacle having a primary coil, wherein a plurality of steering coils are arranged around the primary coil, the method comprises the steps of: establishing an initial phase condition pattern of the magnetic fields of the steering coils relative to the phase of the magnetic field of the primary coil; activating the target device; determining the power transfer between the primary coil and the secondary coil in the target device when the steering coils are in their initial phase condition pattern; altering the magnetic field phase condition pattern of the steering coils repeatedly until a coil phase pattern is determined which produces a maximum power transfer between the primary coil and the secondary coil; and charging the secondary coil with the maximum power transfer phase pattern of the steering coils.

Figure 1:
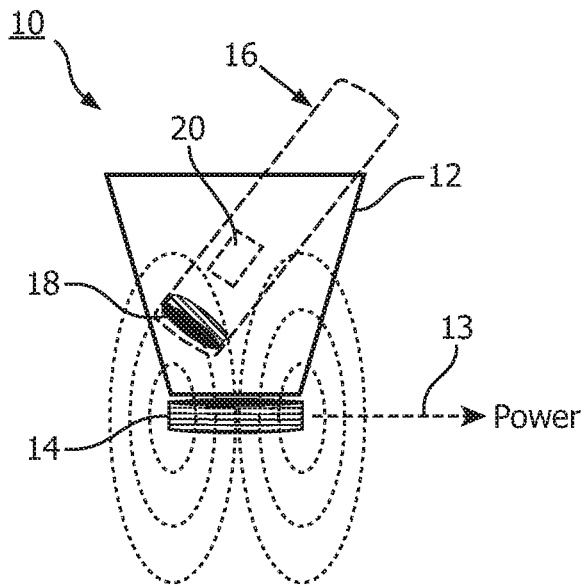
FIGS. 1 and 2 are elevational and top views showing a prior art primary coil charging system with a cup receptacle.
Figure 2:
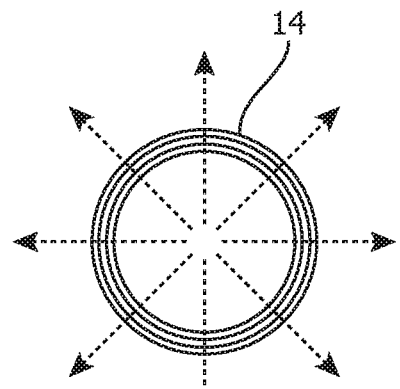

FIGS. 1 and 2 show a prior art system 10 with a primary coil 14 located in a base cup receptacle 12. The primary coil is connected to a conventional power source by means of a power cord 13 and a frequency conversion system (not shown) if necessary. Positioned in receptacle 12 for charging is a target device 16. The target device, which can be for instance a power toothbrush, includes a secondary coil 18 in the base thereof. FIG. 1 shows the magnetic field of the primary coil in an elevational view, while FIG. 2 shows just the primary coil magnetic field from a top view. In the arrangement of FIGS. 1 and 2, target device 16 is placed in cup receptacle 12, which is shaped to also function as a drinking cup for the user, for water or other liquid, such as mouthwash. With such a charging cup receptacle, a separate glass is not necessary. The functions of a charger and drinking glass are accomplished in one unit.

In typical charging operation, there is a transfer of energy between the primary coil 14 in the receptacle and the secondary coil 18 to charge a rechargeable battery 20 in the target device. The difficulty with the arrangement of FIG. 1 is that there is not the typical close alignment between the primary coil and the secondary coil to produce efficient charging. With a conventional charger, the target device is positioned vertically in a relatively confined charging receptacle, so the primary coil and the secondary coil are inherently closely aligned. With the receptacle cup of FIG. 1, however, the secondary coil is positioned at an angle relative to the primary coil; this arrangement extends the charging time significantly, as much as 50% or more compared to the normal charging time.

Figure 3:
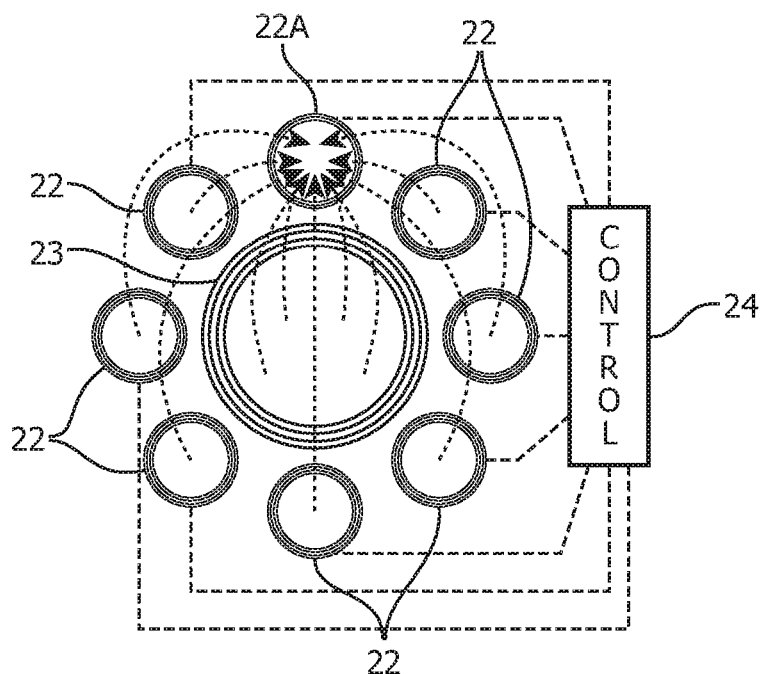
FIGS. 3 and 4 are elevational and top views showing the charging system disclosed herein.
Figure 4:
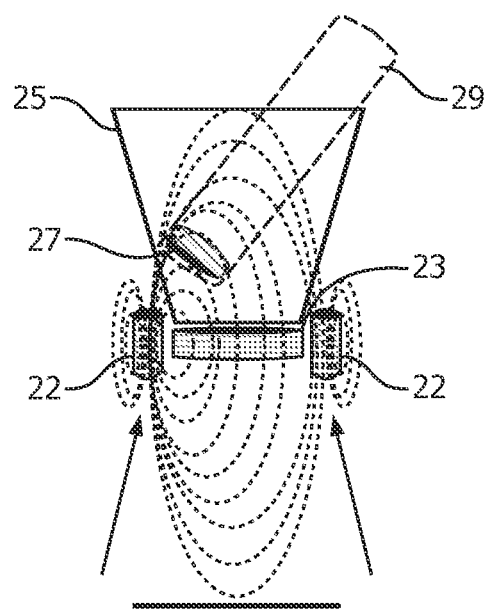

FIGS. 3 and 4 show the present charging arrangement, which includes a plurality of steering coils 22-22 which surround primary coil 14. In one embodiment, there are a total of eight steering coils, but the number of coils could be more than eight, or fewer than eight. A typical range is 2-32 steering coils. In the embodiment shown, the steering coils are equally spaced, although such an arrangement is not necessary. The steering coils are controlled individually by a control unit 24 to produce steering coil magnetic fields which are either in-phase or out-of-phase with the primary coil field. One or more of the steering coils could be in an off condition as well.

FIG. 3 shows seven steering coils 22 with magnetic fields in-phase with the primary coil field and one steering coil 22A with a magnetic field 180° out-of-phase with the primary coil field. Typically, the majority of steering coils are energized in-phase with the primary coil, with a minority of steering coils, typically one, energized 180° out-of-phase from the primary coil. The plurality of steering coil fields shapes and focuses the magnetic field lines from the primary coil such that they are more concentrated in the direction of the out-of-phase steering coil. When the resulting "steered" field of the primary coil, which produces the charging of the secondary coil, is most closely aligned with the position of the secondary coil in the target device, the power transferred to the secondary coil will be increased to the maximum extent, thus increasing the efficiency of the charging system, typically to that of a conventional charging arrangement.

In the arrangement of steering coils shown in FIGS. 3 and 4, the coils are 8 mm in diameter, with 70 turns, although it should be understood that the coils can take other arrangements and configurations. As indicated above, the magnetic fields of the steering coils change the magnetic field pattern of primary coil 23 in receptacle 25 such that there results the greatest transfer of energy to the secondary coil 27 in the target device 29 and hence the greatest charging system efficiency. It is the function of the control system to determine the in-phase, out-of-phase pattern of the steering coils which produces the greatest transfer of energy.

In operation, control unit 24 includes a control loop software circuit in which generally the target device senses the magnetic field from the charging unit, measures the magnetic field received; determines the power, and transmits the value of power received back to the charging unit. The control unit repeatedly adjusts the phase of the magnetic fields of steering coils to produce the maximum power transfer. Communication between the charging unit and the target device can be through various arrangements, including wireless, optical or other communication means. Obtaining the maximum power transfer is done by the control unit proceeding through a sequence of switching the various steering coils between in-phase or out-of-phase relative to the primary coil, to determine the particular magnetic field pattern which produces the maximum power transfer. Typically, the sequence starts with one selected coil being out-of-phase, with the remaining coils in-phase with the primary coil. The out-of-phase coil tends to pull the magnetic field in its direction, while the in-phase coils tend to push the magnetic field, thus focusing the primary coil field. When the maximum power transfer has been determined, the control circuit stops its operation and the charging of the target device continues with the determined pattern.

Figure 6:
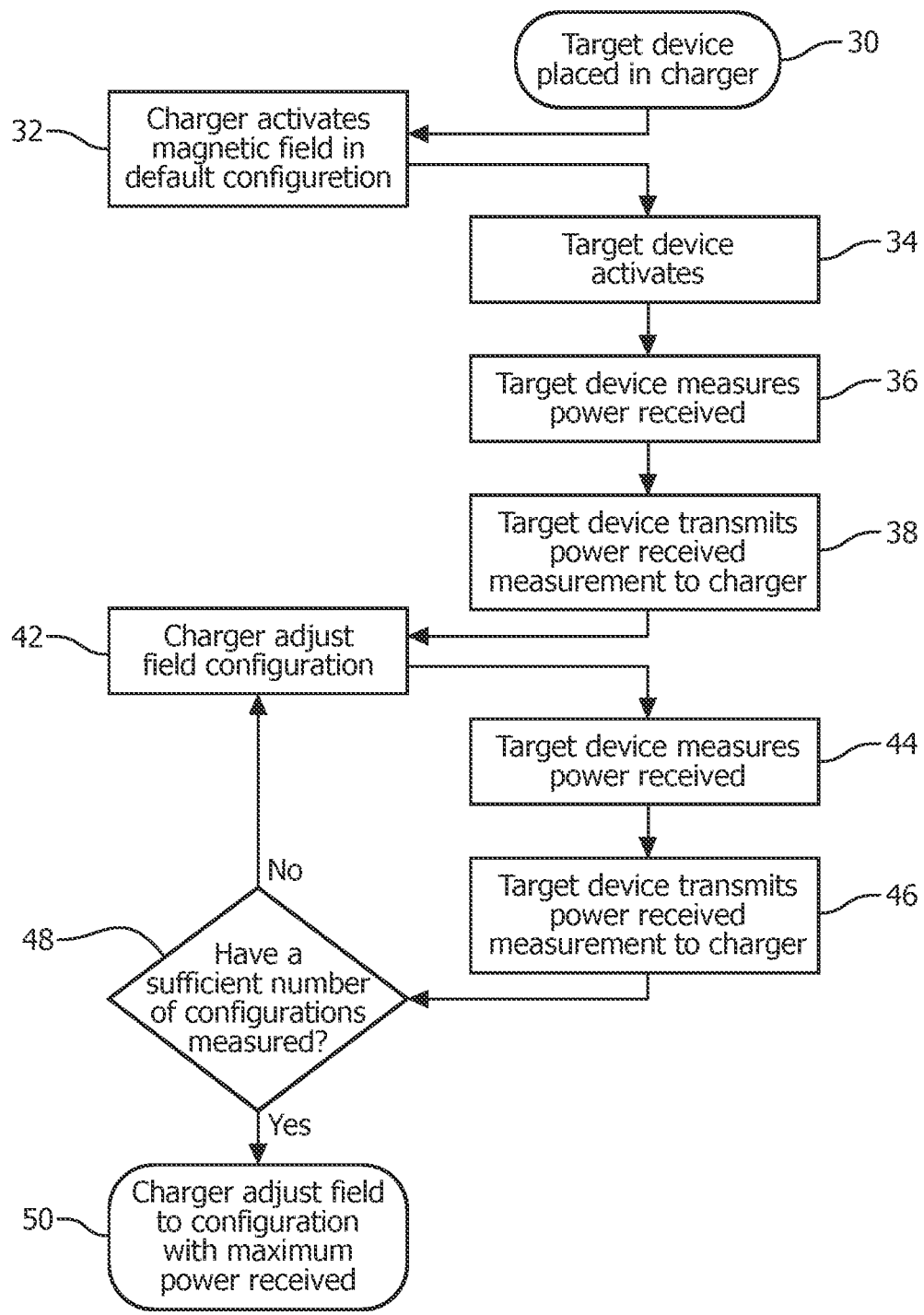
FIG. 6 is a flow chart showing the steps in the control system for controlling the action of the charging system for a single target device.

FIG. 6 shows the control sequence for the charging of a single target device. The target device is first placed in the charging unit/receptacle, as shown at block 30 in FIG. 6. The charger then activates the magnetic field in an initial or default configuration, energizing the various steering coils in a default pattern of in-phase/out-of-phase. e.g. one steering coil out-of-phase, the other steering coils in-phase. This is shown in block 32. The target device activates, as shown in block 34, and determines the power received, by measuring voltage and current and then calculating the power, as shown in block 36. The target device then transmits the power determined back to the charging unit (charger), in block 38. The charger then adjusts the magnetic field configuration of the steering coils, i.e. charges the in-phase, out-of-phase pattern or the steering coils, as shown at block 42.

The target device then again determines the power received, at block 44, and again transmits that value back to the charger, as shown in block 46. A decision is made as to whether or not a sufficient number of magnetic field configurations have been measured to correctly obtain a maximum value of power transferred, as shown at decision block 48. If not, the charger again adjusts the magnetic field configuration, and the loop continues, until the output from block 48 is yes. The charging unit then adjusts the magnetic field to the steering coil field arrangement to that where the maximum power is transferred, as shown at final block 50. Charging of the target device then continues with that magnetic field pattern, until charging is complete.

As indicated above, the phase condition of the magnetic fields of the various steering coils will typically be either in-phase or out-of-phase with the magnetic field of primary coil, or in some cases, one or more steering coils will be off. However, in certain arrangements, a phase condition between in-phase or 180° out-of-phase can be used as well.

The advantage of the present arrangement is that high efficiency charging can be accomplished with a charging system which includes a target device with a secondary coil which is not perfectly aligned with the primary coil in the charging unit, which is the case with a receptacle cup charger, as shown in FIG. 4.

Figure 5:
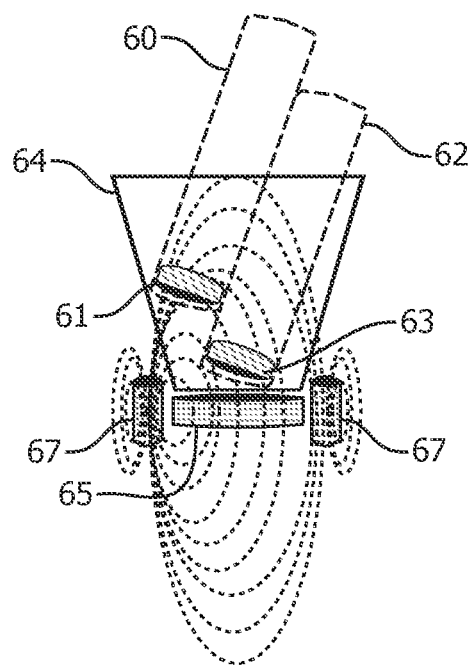
FIG. 5 shows is an elevational view showing the charging system of FIG. 3 using multiple target devices.
Figure 7:
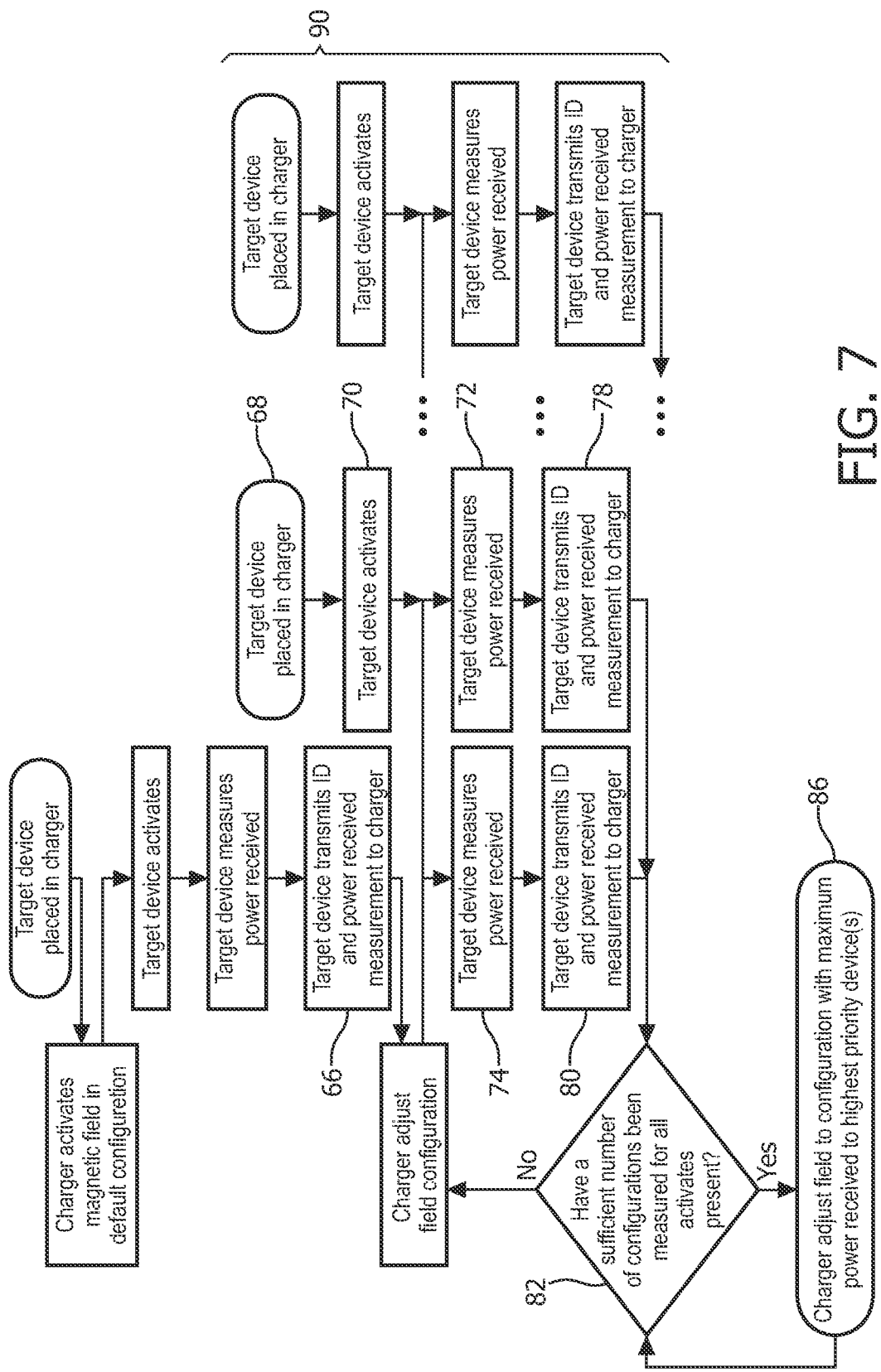
FIG. 7 is a flow chart showing the steps in the control system for multiple target devices.

Referring now to FIG. 5, the present invention can be used with more than one target device. FIG. 5 shows two target devices 60 and 62, with secondary coils 61 and 63, positioned in a charger/receptacle 64, with a primary coil 65. Steering coils are shown at 67. The steering coils surround the primary coil, as in the single target device embodiment. The control sequence, which is shown in FIG. 7, is somewhat more complex than for one target device. FIG. 7 is similar to FIG. 6, with the same receptacle configuration, but with a second target device. The first target device 60 is placed in the charger; the charger and the target device activate and the first target device determines the power received. The first target devices then begins to transmit its ID and the power it receives back to the charger, at block 66, following activation of the steering coil magnetic field in the default configuration. The second target device 62 is placed in the charger along with the first target device at block 68. The second target device activates, at block 70, in response to the power received value from the primary coil 65. The second target device measures the power received, at block 72, along with the first target device, at block 74. The second target device transmits its own ID and the power received by it back to the charger, at block 78, along with the power from the first device, at block 80. A decision is then made as to whether a sufficient number of field patterns/configurations have been measured for both target devices, at block 82. Once a sufficient number of configurations have been measured, the control unit will then adjust the steering coil magnetic field pattern to the configuration where the maximum power is received by the highest priority target device, as shown at block 86. Charging then continues in normal fashion. More than two target devices can also be charged as shown representationally at 90 in FIG. 7.

Accordingly, a system has been disclosed for efficiently charging a target device, such as a power toothbrush, when the charger is in the form of a receptacle such that the secondary coil in the target device is not in alignment with the primary coil in the charger when the target device is place in the receptacle cup for charging.

Although a preferred embodiment of the invention has been disclosed for purposes of illustration, it should be understood that various changes, modifications and substitutions may be incorporated in the embodiment without departing from the spirit of the invention, which is defined by the claims which follows.

The invention claimed is:

1. A system for charging one or more target devices with a receptacle charger, comprising:
    a receptacle charger for receiving one or more target devices, the receptacle having a primary coil therein connectable to a source of electrical power;
    at least one target device positionable in the receptacle, the target device having a secondary coil such that in operation energy is transferred between the primary coil and secondary coil to charge a battery in the target device;
    a plurality of steering coils arranged around the primary coil; and a control system for controlling the magnetic field phase of the steering coils relative to the magnetic field of the primary coil so as to focus the magnetic field lines of the primary coil to optimize power transfer between the primary coil in the receptacle charger and the secondary coil of the target device.

2. The system of claim 1, wherein the target device is a power toothbrush.

3. The system of claim 1, wherein the receptacle is a cup suitable for containing fluid for drinking by a user.

4. The system of claim 1, wherein the steering coils are substantially equally spaced around the primary coil.

5. The system of claim 1, wherein the number of steering coils is in a range of 2-32.

6. The system of claim 5, wherein the number of steering coils is 8.

7. The system of claim 6, wherein magnetic field phase condition of the steering coils includes in-phase, out-of-phase and off.

8. The system of claim 1, wherein the control system executes a plurality of steps including repeatedly altering the magnetic field phase of the steering coils in response to successive power determination values received from the target device in order to determine magnetic field phase pattern which produces the greatest power transfer.

9. The system of claim 1, wherein the control system changes the magnetic field phase pattern of the steering coils in accordance with a predetermined sequence.

10. The system of claim 1, wherein the control system includes a sequence of steps arranged to accommodate power values received from a plurality of target devices with separate IDs, and determining magnetic field phase pattern producing the maximum power transfer between the primary coil and a selected one of the plurality of target devices.

11. A method for controlling charging of at least one target device positioned in a charging receptacle, the target device having a secondary coil and the charging receptacle having a primary coil, wherein a plurality of steering coils are arranged around the primary coil, the method comprising the steps of:
    establishing an initial phase condition pattern of magnetic fields of the steering coils relative to the phase of the magnetic field of the primary coil;
    activating the target device;
    determining power transfer between the primary coil and the secondary coil in the target device when the steering coils are in their initial phase condition pattern;
    altering the magnetic field phase condition pattern of the steering coils repeatedly until a coil phase pattern is determined which produces a maximum power transfer between the primary coil and the secondary coil; and
    charging the secondary coil with the maximum power transfer phase pattern of the steering coils.

12. The method of claim 11, wherein phase condition of the individual steering coils include in-phase with the primary coil, out-of-phase with the primary coil and off.

13. The method of claim 11, wherein the phase pattern of the steering coils is changed in accordance with a preselected sequence until the maximum power transfer is determined.

14. The method of claim 11, wherein two target devices are charged simultaneously and wherein charging of two target devices continues with a phase pattern which produces the maximum power transfer between the primary coil and a selected one of the two target devices.

* * * * *